(12) United States Patent
Jang et al.

(10) Patent No.: US 8,947,608 B2
(45) Date of Patent: Feb. 3, 2015

(54) DISPLAY APPARATUS INCLUDING ELECTROSTATIC PREVENTING PATTERN

(75) Inventors: Eunje Jang, Hwaseong-si (KR); Yeon-Mun Jeon, Cheonan-si (KR); HyunWuk Kim, Yongin-si (KR); Ock Soo Son, Seoul (KR); Woongki Jeon, Busan (KR); Yeon-sik Ham, Suwon-si (KR)

(73) Assignee: Samsung Display Co., Ltd. (KR)

( * ) Notice: Subject to any disclaimer, the term of this patent is extended or adjusted under 35 U.S.C. 154(b) by 211 days.

(21) Appl. No.: 13/608,279

(22) Filed: Sep. 10, 2012

(65) Prior Publication Data

US 2013/0271683 A1    Oct. 17, 2013

(30) Foreign Application Priority Data

Apr. 13, 2012    (KR) ........................ 10-2012-0038679

(51) Int. Cl.
*G02F 1/1333*    (2006.01)
*G02F 1/1343*    (2006.01)

(52) U.S. Cl.
USPC ........................................... 349/40; 349/141

(58) Field of Classification Search
USPC .......................................... 349/40, 111, 141
See application file for complete search history.

(56) References Cited

U.S. PATENT DOCUMENTS

| 6,111,627 | A  | 8/2000 | Kim et al. |
| 6,473,067 | B2 | 10/2002 | Maeda |
| 6,556,263 | B2 | 4/2003 | Gu |
| 6,678,027 | B2 | 1/2004 | Park et al. |
| 7,724,335 | B2 | 5/2010 | Miyachi et al. |
| 2004/0125303 | A1* | 7/2004 | Chung .......................... 349/141 |
| 2004/0263751 | A1* | 12/2004 | Kim et al. ..................... 349/141 |
| 2009/0122240 | A1* | 5/2009 | Lim .............................. 349/106 |
| 2009/0180069 | A1 | 7/2009 | Nishimura |
| 2010/0079694 | A1 | 4/2010 | Yoshida et al. |
| 2010/0277663 | A1 | 11/2010 | Koo |

FOREIGN PATENT DOCUMENTS

| JP | 2010175886 A | 8/2010 |
| KR | 100272514 B1 | 8/2000 |
| KR | 1020050083433 A | 8/2005 |
| KR | 1020060062093 A | 6/2006 |
| KR | 1020070061617 A | 6/2007 |
| KR | 1020080001900 A | 1/2008 |
| KR | 1020080088138 A | 10/2008 |
| KR | 1020090070055 A | 7/2009 |
| KR | 1020100049383 A | 5/2010 |

* cited by examiner

*Primary Examiner* — Michael Caley
(74) *Attorney, Agent, or Firm* — Cantor Colburn LLP

(57) ABSTRACT

A display apparatus includes a first substrate, a second substrate and a liquid crystal layer disposed between the first substrate and the second substrate. The first substrate includes a gate line, a data line, a thin film transistor, a pixel electrode and a common electrode. The common electrode includes a shielding portion which overlaps one of the gate line and the data line. The second substrate includes an electrostatic preventing pattern. The electrostatic preventing pattern contacts the liquid crystal layer and overlaps the shielding portion.

15 Claims, 5 Drawing Sheets

DISPLAY APPARATUS INCLUDING ELECTROSTATIC PREVENTING PATTERN

This application claims priority to Korean Patent Application No. 10-2012-0038679 filed on Apr. 13, 2012, and all the benefits accruing therefrom under 35 U.S.C. §119, the contents of which are hereby incorporated by reference.

BACKGROUND

1. Field

The invention relates to a display apparatus. More particularly, the invention relates to a display apparatus using a horizontal electric field to display images.

2. Description of the Related Art

A liquid crystal display, which is most extensively used as a flat panel display apparatus, includes two substrates and a liquid crystal layer interposed between the two substrates. The liquid crystal display applies an electric field to the liquid crystal layer to rearrange liquid crystal molecules of the liquid crystal layer, and thus the amount of light passing through the liquid crystal layer is controlled.

The liquid crystal display is classified into a vertical electric field mode liquid crystal display and a horizontal electric field mode liquid crystal display in accordance with the direction of the electric field.

The horizontal electric field mode liquid crystal display has been developed since the vertical electric field mode liquid crystal display has disadvantages in viewing angle thereof. In detail, a plane-to-line switching mode liquid crystal display has been researched.

SUMMARY

One or more embodiments of the invention provides a display apparatus capable of effectively discharging an external electrostatic field and improving light transmittance.

One or more embodiments of the invention provide a display apparatus including a first substrate, a second substrate, and a liquid crystal layer disposed between the first substrate and the second substrate. The first substrate includes a gate line, a data line, a thin film transistor, a pixel electrode and a common electrode. The common electrode includes a shielding portion which overlaps one of the gate line and the data line. The second substrate includes an electrostatic preventing pattern. The electrostatic preventing pattern contacts the liquid crystal layer and overlaps the shielding portion of the common electrode.

The electrostatic preventing pattern may be disposed corresponding to the gate line and the data line. The shielding portion of the common electrode and the electrostatic preventing pattern each have a longitudinal axis, and a width taken perpendicular to the longitudinal axis. The width of the shielding portion may be greater than the width of the electrostatic preventing pattern.

The electrostatic preventing pattern may include a transparent electrode and/or a metal material.

According to one or more embodiments of the invention, the display apparatus discharges an external electrostatic field and has improved light transmittance using the electrostatic preventing pattern. In detail, when the electrostatic preventing pattern is overlapped by the shielding portion of the common electrode, an intensity of the horizontal electric field increases in the liquid crystal layer, and thus the light transmittance of the liquid crystal display may be improved.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION

Figure 1:
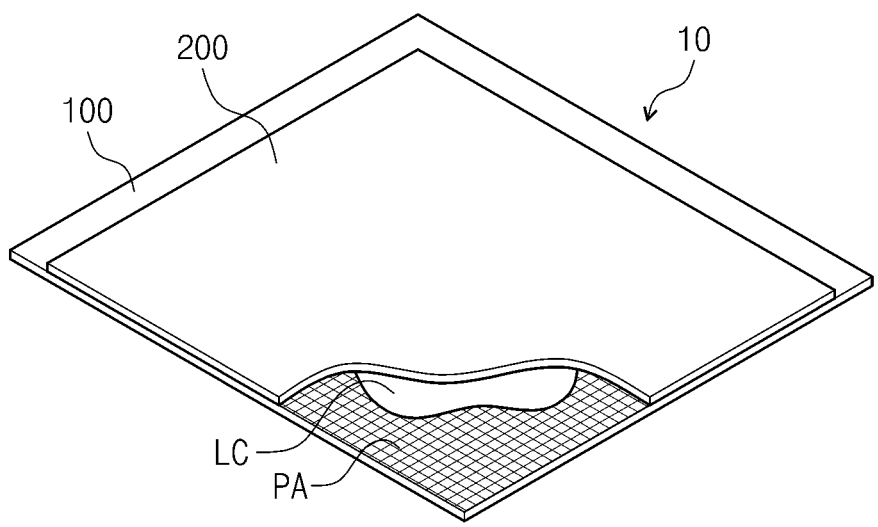
FIG. 1 is an exploded perspective view showing an exemplary embodiment of a display apparatus according to the invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "comprises," "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

According to the horizontal electric field mode liquid crystal display different from the vertical electric field liquid crystal display, an external electrostatic field induced on the upper substrate of the horizontal electric field mode liquid crystal display is not discharged since an electrode does not exist on the upper substrate of the horizontal electric field mode liquid crystal display. As a result, the arrangement direction of the liquid crystal molecules is undesirably changed, so the image is distorted.

FIG. 1 is an exploded perspective view showing an exemplary embodiment of a display apparatus according to the invention.

Referring to FIG. 1, a display apparatus 10 includes a first substrate 100 including a pixel area PA, a second substrate 200 facing the first substrate 100, and a liquid crystal layer LC disposed between the first substrate 100 and the second substrate 200.

The display apparatus 10 includes a pixel. The pixel indicates a portion of the first substrate 100, the second substrate 200 and the liquid crystal layer LC, which corresponds to the pixel area PA.

The first substrate 100 includes at least one thin film transistor, a pixel electrode and a common electrode to drive liquid crystal molecules of the liquid crystal layer LC. The second substrate 200 includes an electrostatic preventing pattern.

The liquid crystal layer LC includes the liquid crystal molecules having an anisotropic dielectric constant. When an electric field is generated between the pixel electrode and the common electrode, the liquid crystal molecules of the liquid crystal layer LC are rotated in a specific direction. Accordingly, a light transmittance of the liquid crystal layer LC is controlled. In the liquid crystal layer LC, a horizontal electric field is formed by voltages respectively applied to the pixel electrode and the common electrode of the first substrate 100.

Figure 2:
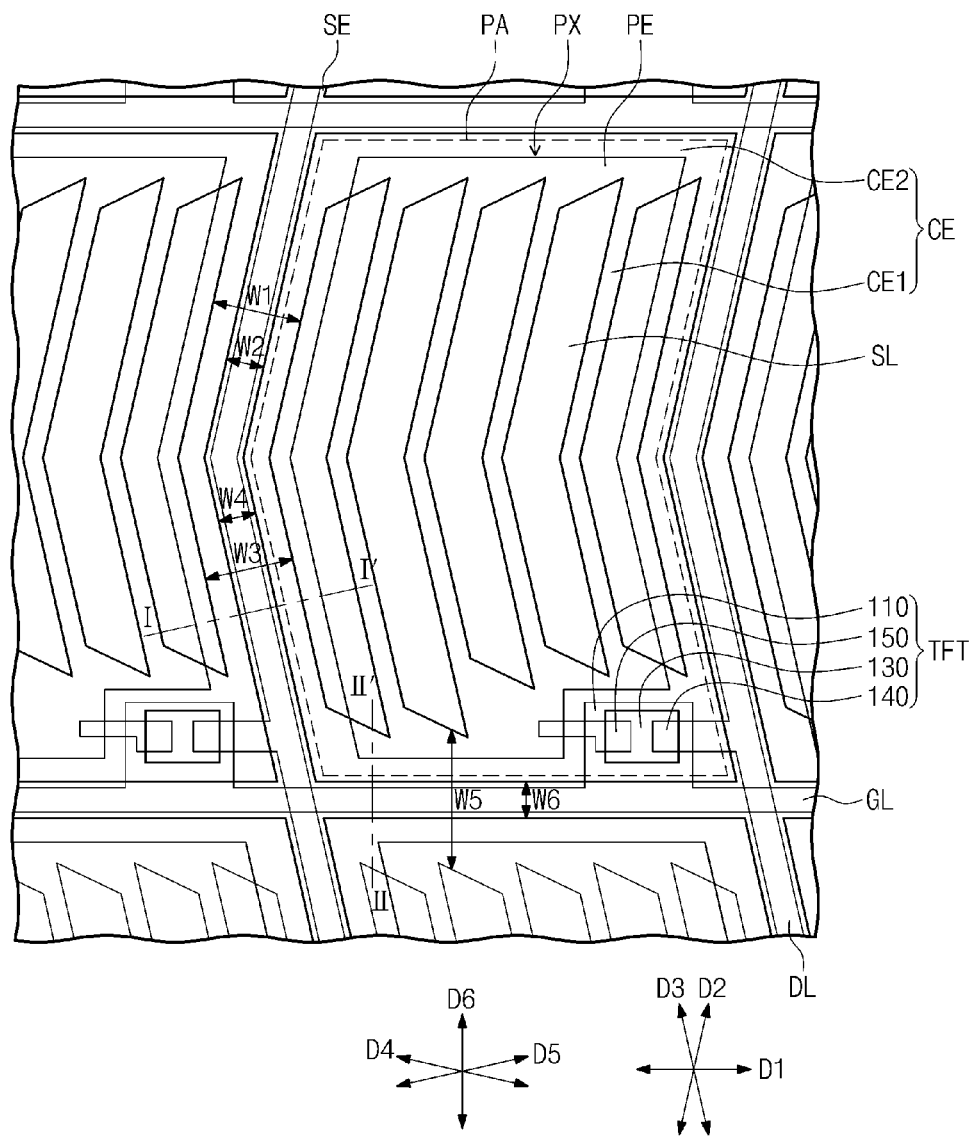
FIG. 2 is a plan view showing an enlarged portion of an exemplary embodiment of a display apparatus according to the invention.
Figure 3:
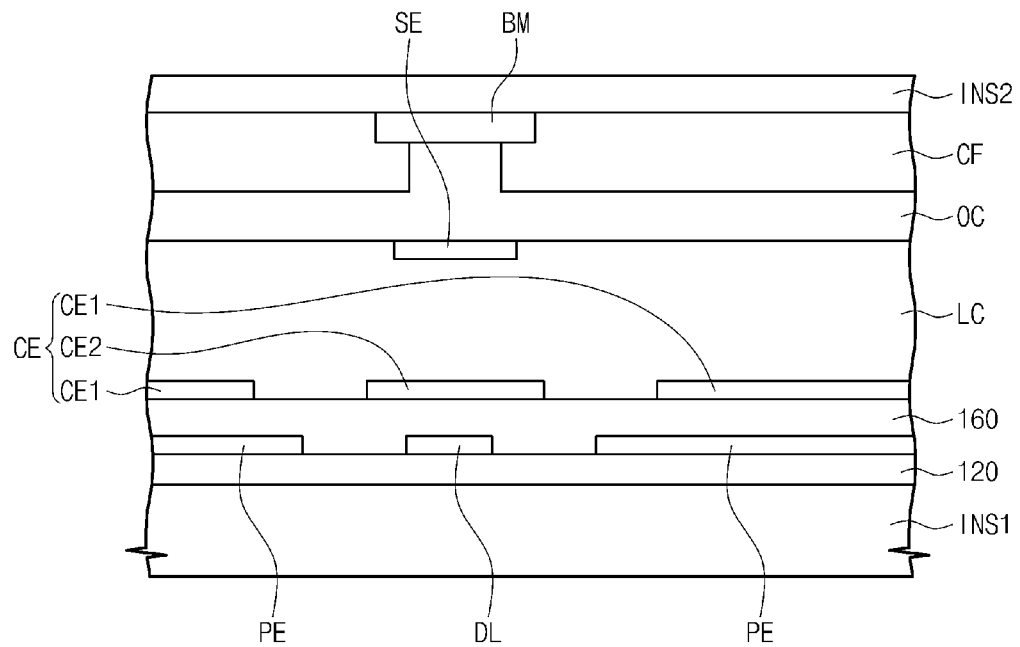
FIG. 3 is a cross-sectional view taken along line I-I' of FIG. 2.
Figure 4:
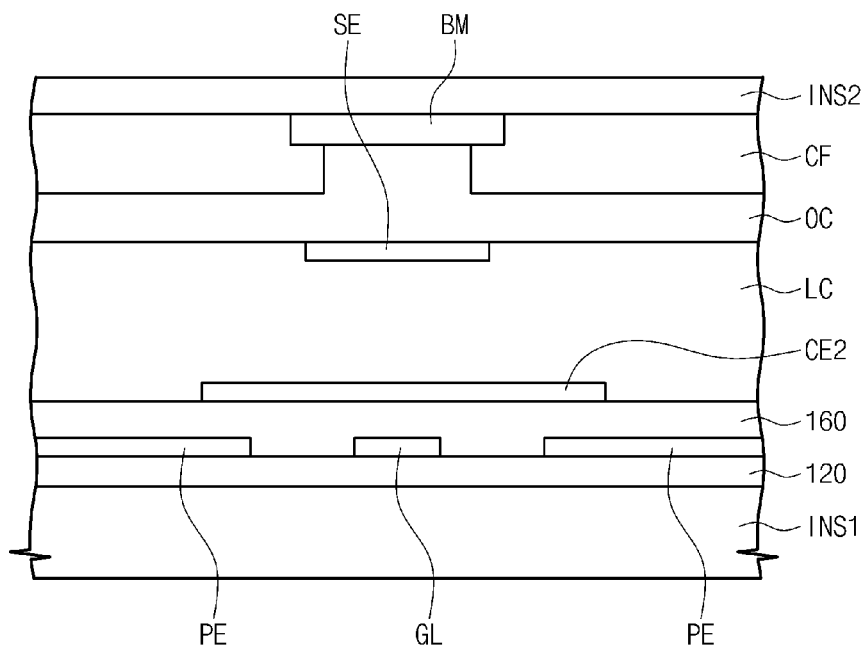
FIG. 4 is a cross-sectional view taken along line II-I' of FIG. 2.

FIG. 2 is a plan view showing an enlarged portion of an exemplary embodiment of a display apparatus according to the invention, FIG. 3 is a cross-sectional view taken along line I-I' of FIG. 2, and FIG. 4 is a cross-sectional view taken along line II-I' of FIG. 2. In FIGS. 2 to 4, one pixel PX and a portion of pixels adjacent to the one pixel PX have been shown for the convenience of explanation.

Referring to FIGS. 2 to 4, the first substrate 100 includes a first insulating substrate INS1, a gate line GL, a data line DL, a thin film transistor TFT, a pixel electrode PE, and a common electrode CE.

The first insulating substrate INS1 may include a transparent insulating material.

The gate line GL is disposed on the first insulating substrate INS1 and has a longitudinal axis which is extended in a first direction D1. The data line DL is disposed on the first insulating substrate INS1 and has a longitudinal axis which is extended in a direction different from the first direction D1, such as being inclined with respect to the first direction D1. In detail, the data line DL may be extended in multiple directions, e.g., a second direction D2 and a third direction D3.

As illustrated in FIG. 2, a single one data line includes a first portion having a longitudinal axis extending in the second direction D2 and a second portion having a longitudinal axis extending in the third direction D3, such that the data line extends in both second and third directions D2 and D3. In FIG. 2, the data line DL is extended once in each of the second direction D2 and the third direction D3 in an area between two gate lines adjacent to each other, but is not limited thereto or thereby. That is, the data line DL may be extended in a direction substantially perpendicular, e.g., vertical in FIG. 2, to the first direction D1. A gate insulating layer 120 is disposed between the data line DL and the gate line GL, and thus the data line DL and the gate line GL are insulated from each other by the gate insulating layer 120.

In an exemplary embodiment, a plurality of pixel areas PA may be defined by the gate line GL and the data line DL, and may be arranged in a matrix form, but the invention is not limited thereto or thereby.

The thin film transistor TFT includes a gate electrode 110, the gate insulating layer 120, a semiconductor pattern 130, a source electrode 140 and a drain electrode 150.

The gate electrode 110 is protruded from and continuous with the gate line GL. The gate electrode 110 is disposed on an upper surface of the first insulating substrate INS1.

The gate insulating layer 120 is disposed on the first insulating substrate INS1 to cover and overlap the gate electrode 110. The gate insulating layer 120 may include an organic insulating material or an inorganic insulating material.

The semiconductor pattern 130 is disposed on the gate insulating layer 120. The semiconductor pattern 130 faces the gate electrode 110, and the gate insulating layer 120 is between the semiconductor pattern 130 and the gate electrode 110. When viewed in a plan view, the semiconductor pattern 130 is covered by (e.g., overlaps) the gate electrode 110. The semiconductor pattern 130 may include amorphous silicon, polysilicon or oxide semiconductor.

The source electrode 140 and the drain electrode 150 are disposed on the gate insulating layer 120 and on the semiconductor pattern 130. The source electrode 140 is branched from and continuous with the data line DL. When viewed in a plan view, the source electrode 140 is overlapped with a portion of the semiconductor pattern 130. The drain electrode 150 is spaced apart from the source electrode 140 and overlapped with a remaining portion of the semiconductor pattern 130.

The pixel electrode PE is connected to the thin film transistor TFT. In detail, the pixel electrode PE is physically and/or electrically connected to the drain electrode 150 to receive a data voltage from the drain electrode 150. The pixel electrode PE is disposed corresponding to the pixel area PA. As used herein, "corresponding" may indicate one element is substantially similar or the same in dimension and/or position with respect to another element.

The common electrode CE is partially overlapped with the pixel electrode PE. The common electrode CE is provided with a plurality of slits SL extending through a thickness thereof, where material of the common electrode CE is absent. FIG. 2 shows the common electrode CE including five slits SL, but the number of the slits SL should not be limited to five. In addition, the slits SL are spaced apart from each other at regular intervals and parallel to the data line DL, however the shape of the slits SL should not be limited thereto or thereby.

The common electrode CE includes a branch portion CE1 and a shielding portion CE2.

The branch portion CE1 is disposed between two slits adjacent to each other of the plurality of slits SL in the pixel area PA and overlapped with the pixel electrode PE. The branch portion CE1 may be provided in a plural number. The number and shape of the branch portions are determined by the number and shape of the slits SL. FIG. 2 shows four branch portions CE1 arranged substantially parallel to the slits SL.

The shielding portion CE2 covers at least one of the gate line GL and the data line DL when viewed in a plan view. FIG. 2 shows the shielding portion CE2 that covers both the gate line GL and the data line DL. The shielding portion CE2 further covers an edge portion of the pixel area PA and is connected to an end portion of the branch portion CE1. The branch portion CE1 and the shielding portion CE2 may collectively form a single, unitary, indivisible common electrode CE.

The shielding portion CE2 prevents an unnecessary electric field from being formed between the data line DL and the branch portion CE1, which is caused by the signal applied to the data line DL. Similarly, the shielding portion CE2 prevents an unnecessary electric field from being formed between the gate line GL and the branch portion CE1, which is caused by the signal applied to the gate line GL.

The common electrode CE receives a common voltage different from the data voltage received by the data line DL.

The common electrode CE is disposed on the pixel electrode PE and is insulated from the pixel electrode PE. An insulating layer 160 is disposed between the common electrode CE and the pixel electrode PE.

The second substrate 200 includes a second insulating substrate INS2, a black matrix BM, a color filter layer CF, a planarization layer OC (also referred to as an overcoat layer), and an electrostatic preventing pattern SE.

The second insulating substrate INK may include a transparent insulating material.

The black matrix BM is disposed on the second insulating substrate INS2. The black matrix BM covers at least one of the gate line GL, the data line DL and the thin film transistor TFT when viewed in a plan view. In addition, the black matrix BM may cover all of the gate line GL, the data line DL and the thin film transistor TFT when viewed in a plan view. The black matrix BM allows a user not to perceive the gate line GL, the data line DL and the thin film transistor TFT, and prevents a light leakage of an internal light.

The color filter layer CF is disposed on the second insulating substrate INS2. The color filter layer CF is disposed corresponding to the pixel area PA so as to cover the pixel electrode PE.

In an exemplary embodiment, the color filter layer CF may have a red, green and/or blue color. The overcoat layer OC is disposed on the black matrix BM and the color filter layer CF. The overcoat layer OC may include an insulating material to planarize a surface which includes a step difference formed the black matrix BM and the color filter layer CF.

The electrostatic preventing pattern SE is disposed on the overcoat layer OC and contacts the liquid crystal layer LC. The electrostatic preventing pattern SE is disposed corresponding to the gate line GL and the data line DL, so that the electrostatic preventing pattern SE has a lattice shape in the plan view.

The electrostatic preventing pattern SE may be covered by the shielding portion CE2 when viewed in a plan view. Thus, the shielding portion CE2 has a width greater than a width of the electrostatic preventing pattern SE in fourth and fifth directions D4 and D5, which are respectively perpendicular to the second and third directions D2 and D3 in which the data line DL is extended. In detail, in the area in which the data line DL is extended in the second direction D2, the width W1 of the shielding portion CE2 in the fourth direction D4 is greater than the width W2 of the electrostatic preventing pattern SE in the fourth direction D4. Similarly, in the area in which the data line DL is extended in the third direction D3, the width W3 of the shielding portion CE2 in the fifth direction D5 is greater than the width W4 of the electrostatic preventing pattern SE in the fifth direction D5.

In addition, the width W5 of the shielding portion CE2 is greater than the width W6 of the electrostatic preventing pattern SE in a sixth direction D6 perpendicular to the first direction D1 in which the gate line GL is extended.

The electrostatic preventing pattern SE may be spaced apart from the pixel electrode PE when viewed in a plan view. Accordingly, although the electrostatic preventing pattern SE exists, the transmittance of the internal light of the display apparatus is not lowered since the electrostatic preventing pattern SE does not overlap the pixel electrode PE.

The electrostatic preventing pattern SE may be applied with the same voltage as the common voltage applied to the common electrode CE. Although not shown in figures, the display apparatus 10 further includes a connection spacer to physically and/or electrically connect the first substrate 100 and the electrostatic preventing pattern SE, such that the electrostatic preventing pattern SE receives the common voltage from the first substrate 100 through the connection spacer. Therefore, forming of an unnecessary electric field between the electrostatic preventing pattern SE and the common electrode CE may be reduced or effectively prevented.

The electrostatic preventing pattern SE may include a transparent conductive material, such as indium tin oxide ("ITO"), indium zinc oxide ("IZO"), indium tin zinc oxide ("ITZO"), etc., but is not limited thereto or thereby.

In an exemplary embodiment, the electrostatic preventing pattern SE may include a metal material. In this case, the electrostatic preventing pattern SE is covered by the black matrix BM when viewed in a plan view in order to reduce or effectively prevent lowering of the transmittance by the electrostatic preventing pattern SE including the metal material.

While the electrostatic preventing pattern SE is illustrated as a single layer structure, the structure is not limited thereto or thereby. In an alternative exemplary embodiment, the electrostatic preventing pattern SE may have a multi-layer structure including a metal layer and a transparent electrode layer.

Figure 5:
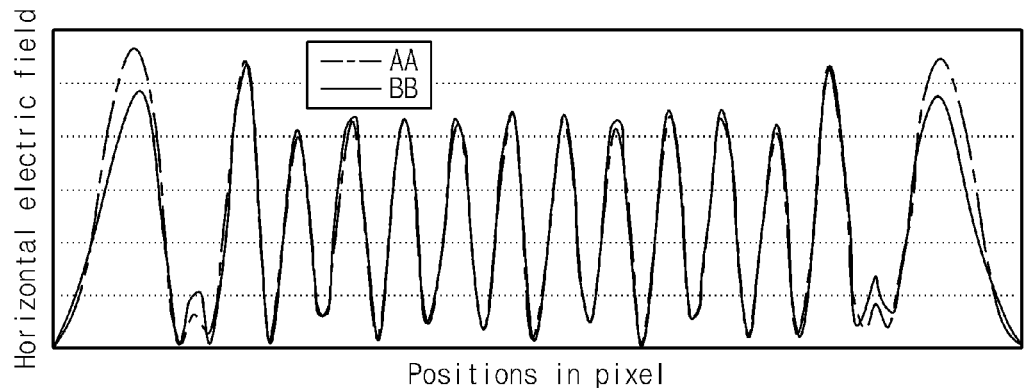
FIG. 5 is a graph showing an intensity of a horizontal electric field as a function of positions in one pixel, relating to the presence or absence of an electrostatic preventing pattern.
Figure 6:
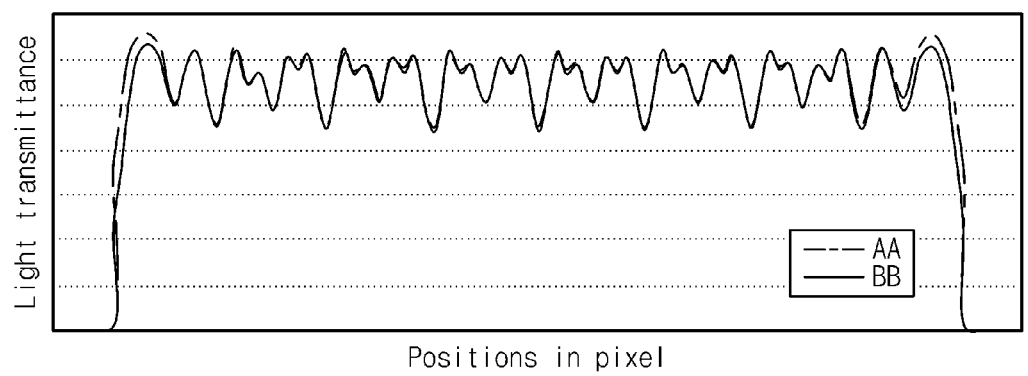
FIG. 6 is a graph showing a transmittance of light passing through a liquid crystal layer as a function of positions in one pixel, relating to the presence or absence of an electrostatic preventing pattern.

FIG. 5 is a graph showing an intensity of a horizontal electric field as a function of positions in one pixel, with respect to the presence of an electrostatic preventing pattern (line AA) or the absence of an electrostatic preventing pattern (line BB). FIG. 6 is a graph showing a transmittance of light passing through a liquid crystal layer as a function of positions in one pixel, with respect to the presence of an electrostatic preventing pattern (line AA) or the absence of an electrostatic preventing pattern (line BB). In FIGS. 5 and 6, an x-axis corresponds to a straight line crossing a center of the one pixel and parallel to the gate line.

Referring to FIGS. 2, 5, and 6, the intensity of the horizontal electric field at the edge portion of the pixel is greater when the electrostatic preventing pattern SE exists (line AA) than the intensity when the electrostatic preventing pattern SE does not exist (line BB). This increase in intensity is due to the electrostatic preventing pattern SE disposed adjacent to the edge portion of the pixel, such that the electric field is formed between the electrostatic preventing pattern SE and the pixel electrode PE in a diagonal direction, and the electric field in the diagonal direction has a horizontal component electric field stronger than a vertical component electric field.

In addition, when the horizontal electric field becomes larger in the edge portion of the pixel, the light transmittance of the liquid crystal layer becomes larger. This increase in light transmittance is due to liquid crystal molecules rotating more by the horizontal electric field when the intensity of the horizontal electric field becomes relatively larger in a portion of the liquid crystal layer than that in adjacent portions thereto.

According to the experimental results illustrated in FIGS. 5 and 6, when the electrostatic preventing pattern SE is disposed corresponding to the black matrix BM, the light transmittance of the liquid crystal layer may be improved by about 3% to about 5% in comparison when no electrostatic preventing pattern SE exists.

Figure 7:
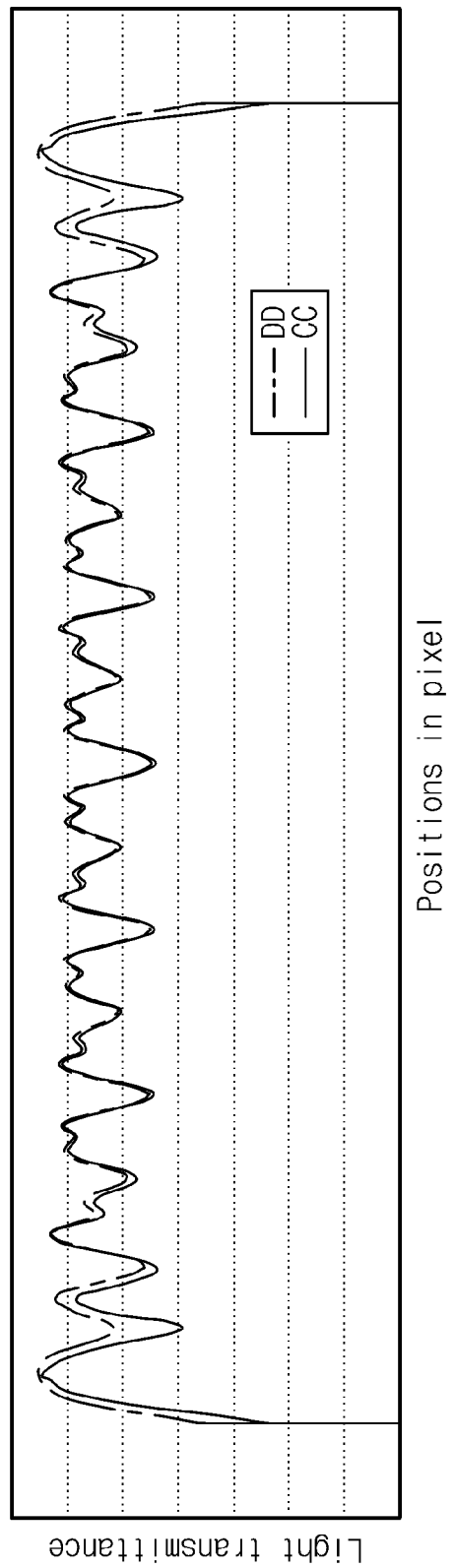
FIG. 7 is a graph showing a transmittance of light passing through a liquid crystal layer as a function of positions in one pixel, where a width of an electrostatic preventing pattern is greater and smaller than a width of a shielding part.

FIG. 7 is a graph showing a transmittance of light passing through a liquid crystal layer as a function of positions in one pixel, where a width of an electrostatic preventing pattern is greater (line CC) and smaller (line DD) than a width of a shielding portion of the common electrode. FIG. 7 shows the transmittance when the shielding portion has the width of about 10.5 micrometers and the electrostatic preventing pattern has the width of about 6 micrometers (line DD) and when the shielding portion has the width of about 10.5 micrometers and the electrostatic preventing pattern has the width of about 12 micrometers (line CC).

Referring to FIGS. 2 and 7, the light transmittance of the liquid crystal layer is greater by about 3.1% when the width of the electrostatic preventing pattern SE is about 6 micrometers (line DD) than when the width of the electrostatic preventing pattern SE is about 12 micrometers (line CC). This increase in light transmittance is due to the intensity of the vertical electric field formed between the electrostatic preventing pattern SE and the pixel electrode PE becoming large as the width of the electrostatic preventing pattern SE increases. Thus, it is preferred that the width of the electrostatic preventing pattern SE is smaller than the width of the shielding portion CE2 of the common electrode CE and the electrostatic preventing pattern SE is covered by the shielding portion CE2 when viewed in a plan view. In addition, as the size of the one pixel decreases, the influence of the electric field formed by the electrostatic preventing pattern SE and the pixel electrode PE becomes large.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a first substrate comprising:
      a gate line;
      a data line which is insulated from the gate line and crosses the gate line;
      a thin film transistor which is connected to the gate line and the data line;
      a pixel electrode which is connected to the thin film transistor; and
      a common electrode which overlaps the pixel electrode and comprises a shielding portion,
   wherein the shielding portion overlaps one of the gate line and the data line in a plan view;
   a second substrate which faces the first substrate; and
   a liquid crystal layer between the first substrate and the second substrate,
   wherein
   the second substrate comprises an electrostatic preventing pattern which contacts the liquid crystal layer and overlaps the shielding portion of the common electrode, in the plan view, and
   the shielding portion of the common electrode and the electrostatic preventing pattern each have a longitudinal axis, and a width taken perpendicular to the longitudinal axis, and the width of the shielding portion is greater than the width of the electrostatic preventing pattern.

2. The display apparatus of claim 1, wherein the pixel electrode and the common electrode receive voltages which form a horizontal electric field in the liquid crystal layer.

3. The display apparatus of claim 1, wherein the common electrode comprises a plurality of slits.

4. The display apparatus of claim 3, wherein the common electrode further comprises a branch portion which is between adjacent slits among the plurality of slits, and overlaps the pixel electrode.

5. The display apparatus of claim 4, further comprising a pixel area,
   wherein
   the shielding portion of the common electrode overlaps an edge portion of the pixel area, and overlaps the gate line and the data line, in the plan view, and
   the shielding portion is connected to an end portion of the branch portion.

6. The display apparatus of claim 1, wherein a pattern of the electrostatic preventing pattern corresponds to a pattern of the gate line and the data line, in the plan view.

7. The display apparatus of claim 1, wherein the electrostatic preventing pattern is spaced apart from the pixel electrode in the plan view.

8. The display apparatus of claim 1, wherein the common electrode is on the pixel electrode and insulated from the pixel electrode.

9. The display apparatus of claim 1, wherein the common electrode and the electrostatic preventing pattern receive a same voltage.

10. The display apparatus of claim 1, wherein the second substrate further comprises:
    an insulating substrate;

a black matrix on the insulating substrate, wherein the black matrix overlaps one of the gate line, the data line and the thin film transistor, in the plan view;

a color filter layer on the insulating substrate, wherein the color filter layer overlaps the pixel electrode in the plan view; and an overcoat layer on the black matrix and the color filter layer, wherein the electrostatic preventing pattern is on the overcoat layer.

11. The display apparatus of claim 10, wherein the electrostatic preventing pattern comprises a transparent electrode.

12. The display apparatus of claim 10, wherein the electrostatic preventing pattern comprises a metal material.

13. The display apparatus of claim 12, wherein the electrostatic preventing pattern overlaps the black matrix in the plan view.

14. The display apparatus of claim 10, wherein the electrostatic preventing pattern comprises a plurality of layers.

15. The display apparatus of claim 14, wherein the electrostatic preventing pattern comprises a metal layer and a transparent electrode layer.

* * * * *